United States Patent [19]
Bohl et al.

[11] Patent Number: 4,714,178
[45] Date of Patent: Dec. 22, 1987

[54] COLLAPSIBLE STORAGE AND DISPENSING VESSEL

[75] Inventors: Aleck Bohl, Denver; John Meyers, Broomfield; Leandro Valdez, Littleton, all of Colo.

[73] Assignee: The Gates Rubber Company, Denver, Colo.

[21] Appl. No.: 18,877

[22] Filed: Feb. 24, 1987

[51] Int. Cl.⁴ .................. B65D 35/16; B65D 81/02
[52] U.S. Cl. .................................... 222/107; 141/114; 206/521; 156/198; 222/530
[58] Field of Search .................. 206/521; 150/55; 383/107; 141/1, 114; 222/92, 107, 527, 530, 538, 540; 156/198, 306.9, 156

[56] References Cited

U.S. PATENT DOCUMENTS

| | | | |
|---|---|---|---|
| 2,865,419 | 12/1958 | Cunningham | 383/41 X |
| 2,969,102 | 1/1961 | Cunningham | 294/68.3 |
| 3,468,731 | 9/1969 | Obeda | 156/198 X |
| 3,478,952 | 11/1969 | Perlman | 206/521 |
| 3,559,708 | 2/1971 | Cook | 206/521 |
| 4,010,783 | 3/1977 | Ralston | 206/521 |
| 4,567,918 | 2/1986 | Curiel | 222/92 X |
| 4,597,425 | 7/1986 | Tally | 150/55 |
| 4,676,280 | 6/1987 | Curiel | 222/92 X |

*Primary Examiner*—Joseph J. Rolla
*Assistant Examiner*—Michael S. Huppert
*Attorney, Agent, or Firm*—C. H. Castleman, Jr.; H. W. Oberg, Jr.

[57] ABSTRACT

A collapsible generally cylindrical storage vessel having a flattened ramp end portion which accommodates driving upon by a vehicle or the like to pressurize the vessel and dispense fluid, as required. The ramp end is internally reinforced with a bridging insert which inhibits blowout upon pressurization.

11 Claims, 5 Drawing Figures

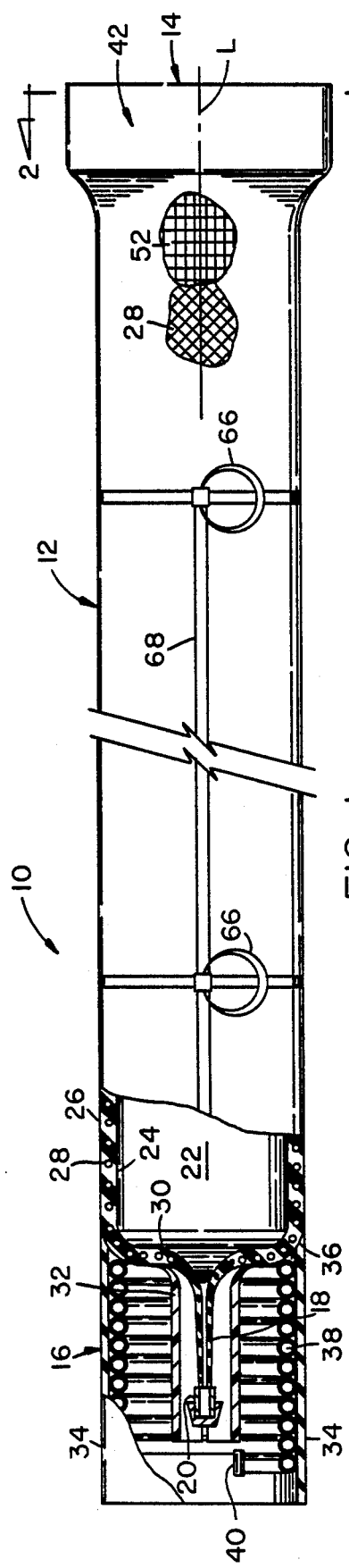
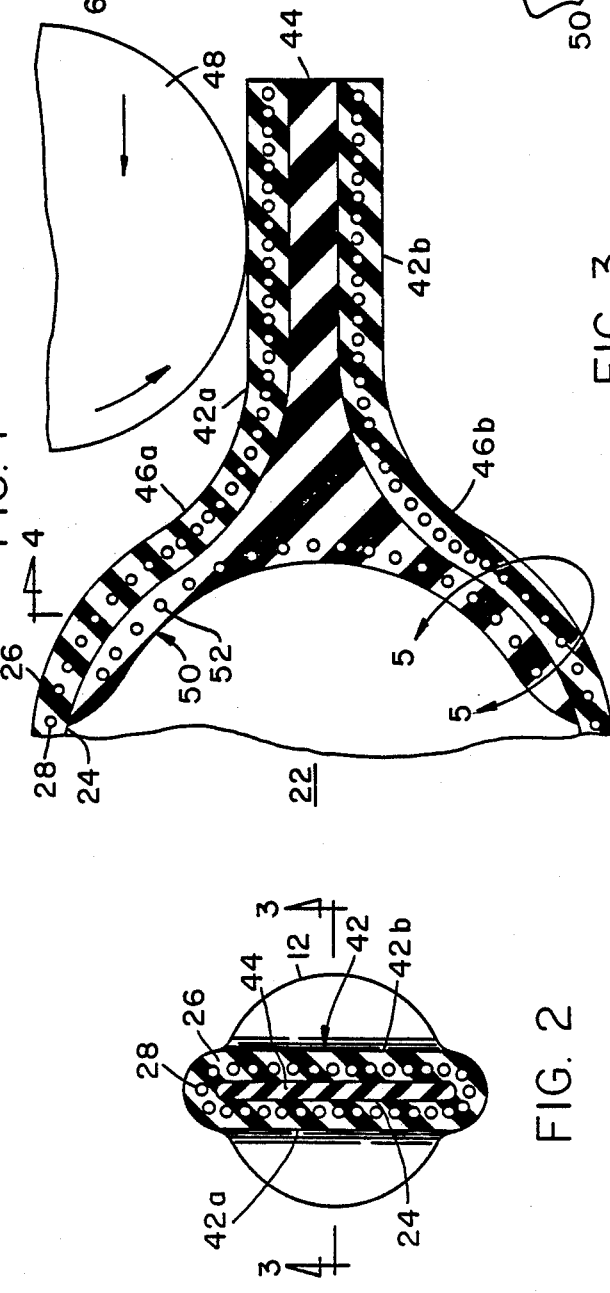
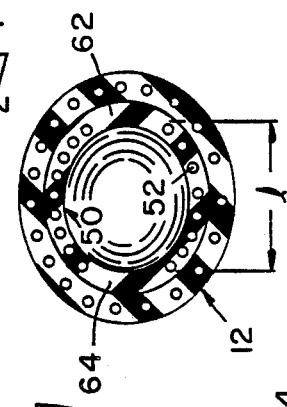
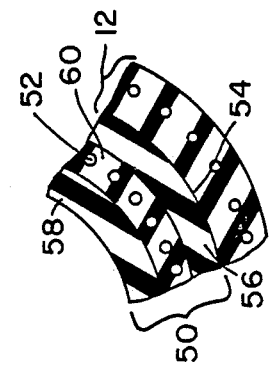

COLLAPSIBLE STORAGE AND DISPENSING VESSEL

BACKGROUND OF THE INVENTION

This invention relates to resilient storage vessels which may be collapsed to dispense fluid from the vessel, and more particularly to such storage vessels which may be dropped from helicopters and the like into remote locations, and which may be compressed between the ground and a vehicle traction means to deliver fluid from the vessel.

Storage vessels of the collapsible type are well known and offer advantages particularly for the remote delivery of fluids where electrical power for pumping is not readily available. In one such application the vessel contains water or other fire extinguishing material which is dropped by helicopter into remote areas to help extinguish a fire. In another example, the collapsible vessel is used to refuel a military vehicle such as a tank when engaged in a combat zone. The tank simply is driven up onto the collapsible vessel causing it to pressurize the vessel and to dispense the liquid contained in the vessel through a line connected between the outlet of the vessel and the fuel tank of the military vehicle.

Collapsible vessels of the aforementioned type are taught, for instance, in U.S. Pat. Nos. 4,567,918 to Curiel and 4,597,425 to Tally. The vessel constructions shown in these patents, while useful, are difficult to manufacture in practice. For instance, the construction shown in U.S. Pat. 4,597,425 is built up on a mandrel by interconnecting the respective end portions to the body portion of the vessel. To remove this preform from the mandrel, the body portion must be severed apart, and then respliced after removal from the mandrel. This splice area not only entails additional manufacturing steps, but in certain instances may be prone to leakage when pressurized, or when air dropped to the ground.

The state of the prior art is also represented by U.S. Pat. Nos. 2,865,419 and 2,969,102 to Cunningham.

It is an object of this invention to provide a collapsible storage and dispensing vessel which is rugged in construction, which will withstand severe impact loads and remain sealed under elevated internal pressure, and which easily accommodates a traction vehicle to effect pressurization of the vessel.

It is another object of the invention to provide the foregoing vessel construction which is relatively easy to manufacture and whose central body portion is continuous rather than spliced.

SUMMARY OF THE INVENTION

Briefly described, the collapsible fluid storage vessel of the invention includes a generally cylindrical body formed of elastomer in which is embedded a reinforcement material, an outlet attached to the body portion and in communication with the interior of the vessel, a flattened ramp end portion extending from the body and formed by pinching together an end of the cylindrical body, and an insert formed of reinforced elastomer bridging and bonded to juxtaposed interior sidewall portions of the cylindrical body at an end thereof adjacent said flattened ramp portion, adapted and arranged to inhibit separation of the flattened ramp end portion upon pressurization of the storage vessel.

BRIEF DESCRIPTION OF THE DRAWINGS

The invention in its preferred embodiment will be more particularly described by reference to the accompanying drawngs, in which:

FIG. 1 is a plan view, partially broken away, depicting a collapsible storage vessel of the invention in a pressurized state;

FIG. 2 is an end sectional view of the vessel of FIG. 1 taken along 2—2 showing the ramp end;

FIG. 3 is a partial sectional view taken along 3—3 of FIG. 2, also illustrating a means for causing the pressurized vessel to collapse and dispense fluid;

FIG. 4 is a reduced cross-sectional view taken along 4—4 of FIG. 3; and

FIG. 5 is an enlarged partial view taken along the line 5—5 of FIG. 3.

PREFERRED EMBODIMENTS OF THE INVENTION

Referring to the figures, the collapsible storage vessel of the invention resembles a toothpaste tube and is shown generally at 10, and comprises a generally cylindrical body portion 12, a sealed distal end portion 14 configured in accordance with the invention, and an outlet end portion 16 adapted to dispense fluid through nozzle 18 equipped with appropriate fitting 20. In the various figures, the storage vessel 10 is shown in its pressurized, expanded state. It will be appreciated that upon removal of the fluid from the interior 22 of the vessel, the resilience of the vessel will permit its substantial collapse and flattening. Portability of the vessel may be enhanced by providing handles 66, attached to strap member 68.

Body 12 is preferably formed of a generally cylindrical carcass formed of an elastomeric material formed of a liner 24, cover 26, each formed of elastomeric material of the same or compatible type, in which is embedded a suitable reinforcement 28. The elastomeric materials used will be chosen for their specific properties depending on the application. Typically, the elastomeric materials will be chosen from natural or synthetic rubbers such as acrylonitrile butadiene polymer, neoprene or EPDM, blended with or without suitable fillers, plastic materials, reinforcing agents, accelerators, curing agents and the like, as is well known in the art.

Reinforcement 28 may be selected from various materials and configurations, including filaments or fabrics twined about the cylindrical body so as to reinforce the wall of the body 12 against burst, although preferably providing for some radial expansion to give the body 12 a compliance to inhibit rupture when dropped, for instance, from elevated heights. Thus, reinforcement 28 could be applied in the form of spiraled filaments whose angle relative to the longitudinal axis L is somewhat less than the locked angle, i.e., somewhat less than about 54 degrees. Preferably, the individual filaments will be disposed at an angle from about 48 to about 52 degrees relative to the longitudinal axis L. Typical materials which may be used include fibers of polyester, nylon, aramid, glass, and the like, in the form of alternate spiral courses, braid, a hybrid of spiral and braid, knit, tire cord, wrap or the like. Bonding agents may be used to enhance adhesion between the individual reinforcement members 28 and the liner and cover members 24 and 26, respectively.

Proximal end 16 includes curvilinear end or shoulder portion 30 joined, e.g., through vulcanization to body 12 and terminating in the extended nozzle 18 to form an integral vulcanized body. Nozzle 18 and fitting assembly 20 are protected by an inner protective split sleeve 32 formed of suitable rubber or plastic material attached to shoulder 30. Further protection for the nozzle and fittings is provided by outer cowling 34 which is attached to body 12 at interface 36. It has been found that this connection should be formed by vulcanization of the cowling 34 directly to the body 12 of the vessel (rather than cold bonding) to withstand the shock and vibration encountered in many applications.

Cowling 34 not only serves to protect the nozzle and fittings but also defines an annular cavity about the inner sleeve 32 in which a length of hose 38 may be coiled for ready use merely by coupling end fitting 40 of the hose to fitting member 20 of the outlet.

In accordance with the invention, the distal end 14 of the fluid storage vessel is formed as a flattened ramp 42, which is an extension of body 12 which has been formed by pinching the end of the body together and vulcanizing to form a sealed joint. This forms opposed flat surfaces 42a and 42b which, being an extension of the body portion 12, are formed of the same liner 24, cover 26 and embedded reinforcement 28 as in the body portion 12. In addition, for reasons that will be explained hereafter, it is highly preferred to position a plug member 44 sandwiched between the end surfaces 42a and 42b and joined thereto preferably solely by covulcanization.

The pinched off ramp end provides inclined surfaces or ramps 46a, 46b serving to accommodate the wheel of a vehicle shown schematically (no load) at 48 to be driven onto the ramp end and the body 12 to compress it and thereby raise the internal pressure in chamber 22 and expel fluid through the outlet, as desired.

Critical to meeting the objectives of the invention and to prevent blowout through the distal end 14, is the provision of insert 50 (see FIGS. 3–5) which serves as a bridge between the internal surfaces of upper ramp portion 46a and lower ramp portion 46b to which it is bonded. Pressure developed internally within the vessel in space 22 will thereby be distributed over the full interior surface of the body and the inner face of insert 50, rather than being concentrated at the end of the body adjacent the flattened end portion 14 of the vessel. Thus, insert 50 should be of sufficient dimension to provide a bond area adequate to exceed the anticipated working pressure of the vessel.

Insert 50 is formed of an elastomer material reinforced with textile fabric, tire cord or the like, the preferred form being a square-woven fabric of fairly tight pack, with the fibers or filaments of the reinforcement having a substantial reinforcing component with respect to the longitudinal axis L of the storage vessel as shown in FIG. 1. Alternatively, the fibers 52 extending lengthwise may be disposed at a slight angle with respect to such longitudinal axis L, e.g. at 0° to about 15°.

In the preferred embodiment illustrated in FIG. 5, insert 50 and wall 12 of the cylindrical body are bonded together along their interface 54, preferably by covulcanization to form a cross-linked vulcanizate. Thus, inner layer 56 of the insert should be compatible with the wall material 12. Similarly, in the event reinforcement members 52 do not directly or readily bond to inner layer 56 and outer layer 58 of insert 50, it is preferred to provide a tie gum or interlayer 60 which is compatible with the reinforcement members 52 as well as readily bonding through vulcanization to adjoining layers 56 and 58.

As an example that has been found useful in practice for producing a vessel for storing and dispensing fuel, wall 12, and layers 56 and 58 of the insert are all formed of NBR rubber (acrylonitrile butadiene), reinforcement 52 is formed of a square-woven nylon material of fairly tight pack, although with some space between strands or yarns. The lengthwise reinforcing members 52 are disposed at an angle of about 13 degrees to the longitudinal axis of the vessel, and the reinforcing members 52 are embedded in a tie gum layer 60 formed of neoprene rubber. Layers 58, 60 and 56 in this example are each about 0.060 inches (1.5 mm) thick, and layer 12 is approximately 0.355 inches (9.02 mm) thick. In this example, the length of the vessel including cowling 34 is about 10 feet 4 inches (3.15 m) and has a capacity of 55 gallons. The outside diameter of the vessel is about 14 inches (35.6 cm). Insert member 50 was formed into an envelope configuration formed of plies of gum stock and fabric, with the fabric having the original dimension of 18¾ inches × 6 inches (47.63 cm × 15.24 cm), with the long dimension being shown in FIG. 4 as length "1." As shown in FIG. 4, as a result of forming insert 50 as an envelope, reinforcing members 52 are purposely confined substantially to the upper and lower surfaces of the vessel (juxtaposed to ramp surfaces 46a and 46b, respectively). This has been found to greatly improve the compliance of the insert and permit necessary flexing, substantially without restriction, as the vessel is pressurizd and depressurized (cycled). Thus, the lateral sides 62, 64 of the insert should preferably be gum stock (free of reinforcement). In effect, these end areas 62, 64 undergo significant hinging in operation and therefore need to alternately stretch and elastically rebound.

A number of tests were performed on storage vessels of the invention of the type disclosed above. The only difference between 25-gallon units described below and the above-mentioned 55-gallon unit is the body length. In the first test, the objective was to evaluate the integrity of the ramp end construction. The test procedure was as follows: (i) One 25-gallon ramp end vessel of the general construction of FIG. 1 was filled with 25 gallons of diesel fuel and allowed to age under outdoor ambient conditions for 10 days; (ii) The diesel fuel was then removed from the test cell by gravity feed into a second unit. This was done as a safety precaution for the drive-on portion of the test. The test cell was then refilled with approximately 15 gallons of water. A four foot extension hose was attached to the nozzle end of the test unit and plugged with a pressure gauge; (iii) The test cell was driven on with a 9,400 pound GVW truck loaded with 8,200 pounds of steel. The dual rear wheels (9 × 20 tires) of the vehicle were used to ramp on and off the test unit (one cycle). The road surface was a coarse aggregate concrete.

The test was terminated after successfully completing 100 cycles at a rate of approximately two cycles per minute.

Examination of the ramp end after the test revealed no signs of deterioration.

In the second test the integrity of the ramp end seal was evaluated after prolonged contact with diesel fuel.

The test unit was filled with diesel fuel and aged for 72 days under ambient conditions.

A truck was used for the drive-on test. The total weight of the vehicle and payload was approximately 17,000 pounds (this generated 20 psig internal pressure). The test was terminated after completing 100 drive-on cycles. No leakage was noted. However, the carcass of the unit did show some fraying from the ramp end seal along the rear edge of the ramp end, which was not detrimental to operation of the vessel.

In a third test, a 25-gallon ramp end vessel of the general construction of FIG. 1 was driven on by a 53-ton Army tank, the track of which overlayered and extended from the nozzle to the flattened ramp end of the vessel. A pressure of 40 psig was developed without any leakage or failure of the vessel.

In the fourth test, two 25-gallon and two 55-gallon ramp end vessels were subjected to a room temperature water burst test. Each of the units burst at from about 100-112 psig. In each case the body 12 of the vessels ruptured, but not the ramp ends, which remained in tact.

In the last test, a similar vessel as in the above tests was air dropped from a height of 150 to 200 feet above ground by a helicopter flying at an air speed of 60+ knots. After impact the vessel was inspected and found to be intact and in all respects okay.

While certain representative embodiments and details have been shown for the purpose of illustrating the invention, it will be apparent to those skilled in this art that various changes and modifications may be made therein without departing from the spirit or scope of the invention.

What is claimed is:

1. A collapsible fluid storage vessel comprising:
   a generally cylindrical body formed of elastomer in which is embedded a reinforcement material;
   an outlet attached to the body portion and in communication with the interior of the vessel;
   a flattened ramp end portion extending from the body and formed by pinching together an end of the cylindrical body; and
   an insert formed of reinforced elastomer bridging and bonded to juxtaposed interior sidewall portions of the cylindrical body at an end thereof adjacent said flattened ramp portion, adapted and arranged to inhibit separation of the flattened ramp end portion upon pressurization of the storage vessel.

2. The collapsible fluid storage vessel of claim 1 wherein the outlet includes an elongated nozzle, and a cowling integrally attached to the cylindrical body at one end thereof in surrounding relation to the outlet, the cowling being formed of an elastomeric material bonded by vulcanization to the cylindrical body.

3. The collapsible fluid storage vessel of claim 1 wherein the reinforcement material in the insert extend along and in adjacent relation to ramp surfaces of said flattened ramp end portion, but such reinforcement does not extend continuously around the interior sidewall portion of the insert, permitting a substantial hinging action during pressurization and depressurization of the storage vessel.

4. The collapsible fluid storage vessel of claim 3 wherein the insert is formed of an inner elastomeric member bonded to the cylindrical body, an outer elastomeric member compatible with the fluids designed for use with the vessel, a tie gum elastomer bonded to each of the inner and outer layers of the insert, and the reinforcement being disposed within the time gum layer, the tie gum layer being compatible and bonded to the reinforcing members as well as the adjoining inner and outer layers.

5. The collapsible fluid storage vessel of claim 1 wherein the flattened ramp and portion includes an elastomeric plug portion sandwiched between the sidewalls of said body portion.

6. The collapsible fluid storage vessel of claim 5 wherein the flattened ramp end portion is held together as a sealed laminate solely by covulcanization of the elastomeric plug and body wall portions.

7. A collapsible storage vessel of generally toothpaste tube configuration for dispensing fluids, comprising:
   a generally cylindrical body formed of elastomer reinforced by a textile material disposed at an angle to the longitudinal axis of the vessel so that limited expansion of the vessel may take place upon pressurization of the vessel;
   an outlet including a nozzle means attached to the body portion and in communication with the interior of the vessel;
   a flattened end portion extending from the body and having upper and lower ramp portions, adapted to be driven up on by a wheeled or tracked vehicle to apply compressive force to the vessel to pressurize it and assist in expelling fluids therefrom; and
   an insert formed of reinforced elastomer bridging and bonded to interior sidewall portions of the cylindrical body juxtaposed to said upper and lower ramp portions adjacent said flattened end portion, adapted and arranged to inhibit separation of the flattened end portion upon pressurization of the storage vessel.

8. The collapsible fluid storage vessel of claim 7 wherein the outlet includes an elongated nozzle, and a cowling attached to the cylindrical body at one end thereof in surrounding relation to the outlet, the cowling being formed of an elastomeric material bonded by vulcanization to the cylindrical body.

9. The collapsible fluid storage vessel of claim 7 wherein the insert is formed of an inner elastomeric member bonded to the cylindrical body, an outer elastomeric member compatible with the fluids designed for use with the vessel, a tie gum elastomer bonded to each of the inner and outer layers of the insert, and the reinforcement being disposed within the tie gum layer, the tie gum layer being compatible and bonded to the reinforcing members as well as the adjoining inner and outer layers.

10. The collapsible fluid storage vessel of claim 7 wherein the flattened ramp end portion includes a plug portion sandwiched between the sidewalls of said body portion.

11. The collapsible fluid storage vessel of claim 7 wherein the flattened ramp end portion is held together as a sealed laminate solely by covulcanization of the elastomeric plug and body wall portions.

* * * * *